(12) United States Patent
Fang et al.

(10) Patent No.: US 11,726,834 B2
(45) Date of Patent: Aug. 15, 2023

(54) PERFORMANCE-BASED WORKLOAD/STORAGE ALLOCATION SYSTEM

(71) Applicant: Dell Products L.P., Round Rock, TX (US)

(72) Inventors: Yung-Chin Fang, Austin, TX (US); Xiaoye Jiang, Shrewsbury, MA (US); Frank Widjaja Yu, Austin, TX (US); Jingjuan Gong, Westborough, WA (US)

(73) Assignee: Dell Products L.P., Round Rock, TX (US)

( * ) Notice: Subject to any disclaimer, the term of this patent is extended or adjusted under 35 U.S.C. 154(b) by 884 days.

(21) Appl. No.: 16/510,629

(22) Filed: Jul. 12, 2019

(65) Prior Publication Data
US 2021/0011779 A1    Jan. 14, 2021

(51) Int. Cl.
*G06F 3/00* (2006.01)
*G06F 9/50* (2006.01)
*G06F 3/06* (2006.01)

(52) U.S. Cl.
CPC ............ *G06F 9/5083* (2013.01); *G06F 3/061* (2013.01); *G06F 3/0658* (2013.01); *G06F 3/0689* (2013.01); *G06F 9/5016* (2013.01); *G06F 2209/5019* (2013.01)

(58) Field of Classification Search
CPC ...... G06F 9/5083; G06F 3/061; G06F 3/0658; G06F 3/0689; G06F 9/5016; G06F 2209/5019
See application file for complete search history.

(56) References Cited

U.S. PATENT DOCUMENTS

| 6,408,406 B1 | 6/2002 | Parris |
| 8,868,797 B1 | 10/2014 | Kirac et al. |
| 9,703,664 B1 * | 7/2017 | Alshawabkeh ......... G06F 3/067 |

* cited by examiner

*Primary Examiner* — Reginald G Bragdon
*Assistant Examiner* — Michael L Westbrook
(74) *Attorney, Agent, or Firm* — Joseph Mencher

(57) ABSTRACT

A performance-based workload/storage allocation system includes a workload/storage allocation device coupled via controller device(s) to storage devices that each include a respective storage device attribute structure having storage device attributes that identify performance capabilities of that storage device. The workload storage/allocation device identifies a first workload that requires storage resources, and retrieves first workload performance requirement(s) associated with the first workload. The workload storage/allocation device then retrieves the storage device attributes that identify the performance capabilities of each of the storage devices via the controller device(s) and from the respective storage device attribute structure included in each of the storage devices, and uses them to determine that at least one of the plurality of storage devices includes performance capabilities that satisfy the first workload performance requirement(s). The workload/storage allocation device then allocates the at least one of the plurality of storage devices for use with the first workload.

20 Claims, 14 Drawing Sheets

| Byte | Bit | | | | | | | | Applies To |
|---|---|---|---|---|---|---|---|---|---|
| | 7 | 6 | 5 | 4 | 3 | 2 | 1 | 0 | |
| 0 | PERIPHERAL QUALIFIER (000b) | | | PERIPHERAL DEVICE TYPE (00000b) | | | | | All |
| 1 | PAGE CODE (DCh) | | | | | | | | All |
| 2 | (MSB) PAGE LENGTH | | | | | | | | All |
| 3 | (11Eh [HDD] or 14Eh [SSD]) (LSB) | | | | | | | | All |
| 4–11 | VENDOR ID (ASCII) | | | | | | | | All |
| 12–27 | PRODUCT ID (ASCII) | | | | | | | | All |
| 28–31 | FIRMWARE REVISION LEVEL (ASCII) | | | | | | | | All |
| 32–51 | PRODUCT SERIAL NUMBER (ASCII) | | | | | | | | All |
| 52–59 | TARGET DEVICE NAME (SAS) | | | | | | | | All |
| 60–67 | TARGET PORT IDENTIFIER 1 (SAS) | | | | | | | | All |
| 68–75 | TARGET PORT IDENTIFIER 2 (SAS) | | | | | | | | All |
| 76–79 | NOMINAL FORM FACTOR WIDTH (ASCII) | | | | | | | | All |
| 80–83 | NOMINAL FORM FACTOR HEIGHT (ASCII) | | | | | | | | All |
| 84–91 | DEVICE ID (ASCII) | | | | | | | | All |
| 92–99 | SERVO CODE LEVEL (ASCII) | | | | | | | | HDD |
| 100–115 | PCBA SERIAL NUMBER (ASCII) | | | | | | | | All |
| 116–131 | PCBA PART NUMBER (ASCII) | | | | | | | | All |
| 132–147 | DISK MEDIA VENDOR (ASCII) | | | | | | | | HDD |
| 148–163 | MOTOR SERIAL NUMBER (ASCII) | | | | | | | | HDD |
| 164–179 | FLEX CIRCUIT ASSEMBLY SERIAL NUMBER (ASCII) | | | | | | | | HDD |
| 180–195 | HEAD VENDOR (ASCII) | | | | | | | | HDD |
| 196–211 | HDC REVISION (ASCII) | | | | | | | | HDD |

STORAGE DEVICE ATTRIBUTE STRUCTURE 500

FIG. 5A

| Byte | Applies To | Bit 7 | 6 | 5 | 4 | 3 | 2 | 1 | 0 |
|---|---|---|---|---|---|---|---|---|---|
| 212–227 | HDD | ACTUATOR SERIAL NUMBER (ASCII) | | | | | | | |
| 228–243 | HDD | HEAD DISK ASSEMBLY SERIAL NUMBER (ASCII) | | | | | | | |
| 244–247 | All | YEAR OF MANUFACTURE (ASCII) | | | | | | | |
| 248–249 | All | WEEK OF MANUFACTURE (ASCII) | | | | | | | |
| 250–251 | All | DAY OF MANUFACTURE (ASCII) | | | | | | | |
| 252–259 | All | LOCATION OF MANUFACTURE (ASCII) | | | | | | | |
| 260–283 | All | DELL PPID (ASCII) | | | | | | | |
| 284 | All | (MSB) NOMINAL MEDIUM ROTATION RATE | | | | | | | |
| 285 | All | | | | | | | | (LSB) |
| 286 | All | Reserved (00b) | | SPI | DFD | DAIC | SFD | Res (0b) | SED |
| 287 | All | Reserved (00h) | | | | | Airflow Impedance Category | | |
| 288 | All | Reserved (00h) | | | | | | | |
| 289 | All | SSD SWIMLANE | | | | | | | |
| 290–297 | SDD | LOW-LEVEL F/W CODE REFERENCE (ASCII) | | | | | | | |
| 298–305 | SDD | FLASH SILICON SUPPLIER (ASCII) | | | | | | | |
| 306–321 | SDD | CONTROLLER CHIP NAME & REVISION (ASCII) | | | | | | | |
| 322–337 | SDD | SSD MECHANICAL ASSEMBLY (ASCII) | | | | | | | |
| 338 | ALL | INITIATOR COUNT | | | | | | | |
| 339 | ALL | RESERVED | | | | | | | |
| 340 | ALL | CODING/DECODING SCHEME | | | | | | | |
| 341 | ALL | DISK SCHEDULING POLICY | | | | | | | |
| 342 | ALL | BLOCK SIZE (UNSIGNED INT) | | | | | | | |
| 343–346 | ALL | WORST CASE IOPS (SINGLE PRECISION FP) | | | | | | | |
| 347–350 | ALL | AVERAGE CASE IOPS (SINGLE PRECISION FP) | | | | | | | |

STORAGE DEVICE ATTRIBUTE STRUCTURE 500

FIG. 5B

| Byte | Bit Applies To | 7 | 6 | 5 | 4 | 3 | 2 | 1 | 0 |
|---|---|---|---|---|---|---|---|---|---|
| 351 - 354 | ALL | BEST CASE IOPS (SINGLE PRECISION FP) | | | | | | | |
| 355-358 | ALL | WORST CASE THROUGHPUT (SINGLE PRECISION FP) | | | | | | | |
| 359-362 | ALL | AVERAGE CASE THROUGHPUT (SINGLE PRECISION FP) | | | | | | | |
| 363 - 366 | ALL | BEST CASE THROUGHPUT (SINGLE PRECISION FP) | | | | | | | |
| 367-70 | ALL | WORST CASE LATENCY (SINGLE PRECISION FP) | | | | | | | |
| 371-374 | ALL | AVERAGE CASE LATENCY (SINGLE PRECISION FP) | | | | | | | |
| 375 - 378 | ALL | BEST CASE LATENCY (SINGLE PRECISION FP) | | | | | | | |
| 379 | ALL | RESERVED | | | | | | | |
| 380 | ALL | BLOCK SIZE (UNSIGNED INT) | | | | | | | |
| 381-382 | ALL | WORST CASE IOPS (SINGLE PRECISION FP) | | | | | | | |
| 383-386 | ALL | AVERAGE CASE IOPS (SINGLE PRECISION FP) | | | | | | | |
| 387 - 390 | ALL | BEST CASE IOPS (SINGLE PRECISION FP) | | | | | | | |
| 391-394 | ALL | WORST CASE THROUGHPUT (SINGLE PRECISION FP) | | | | | | | |
| 395-398 | ALL | AVERAGE CASE THROUGHPUT (SINGLE PRECISION FP) | | | | | | | |
| 399 - 402 | ALL | BEST CASE THROUGHPUT (SINGLE PRECISION FP) | | | | | | | |
| 403-406 | ALL | WORST CASE LATENCY (SINGLE PRECISION FP) | | | | | | | |
| 407-410 | ALL | AVERAGE CASE LATENCY (SINGLE PRECISION FP) | | | | | | | |
| 411 - 414 | ALL | BEST CASE LATENCY (SINGLE PRECISION FP) | | | | | | | |
| 415 | ALL | RESERVED | | | | | | | |
| 416 | ALL | BLOCK SIZE (UNSIGNED INT) | | | | | | | |
| 417-420 | ALL | WORST CASE IOPS (SINGLE PRECISION FP) | | | | | | | |
| 421-424 | ALL | AVERAGE CASE IOPS (SINGLE PRECISION FP) | | | | | | | |
| 425 - 428 | ALL | BEST CASE IOPS (SINGLE PRECISION FP) | | | | | | | |
| 429-432 | ALL | WORST CASE THROUGHPUT (SINGLE PRECISION FP) | | | | | | | |
| 433-436 | ALL | AVERAGE CASE THROUGHPUT (SINGLE PRECISION FP) | | | | | | | |

STORAGE DEVICE ATTRIBUTE STRUCTURE 500

FIG. 5C

| Byte | Bit Applies To | 7 | 6 | 5 | 4 | 3 | 2 | 1 | 0 |
|---|---|---|---|---|---|---|---|---|---|
| 437-440 | ALL | BEST CASE THROUGHPUT (SINGLE PRECISION FP) | | | | | | | |
| 441-444 | ALL | WORST CASE LATENCY (SINGLE PRECISION FP) | | | | | | | |
| 445-448 | ALL | AVERAGE CASE LATENCY (SINGLE PRECISION FP) | | | | | | | |
| 449-452 | ALL | BEST CASE LATENCY (SINGLE PRECISION FP) | | | | | | | |
| 453 | ALL | RESERVED | | | | | | | |
| 454 | ALL | BLOCK SIZE (UNSIGNED INT) | | | | | | | |
| 455-458 | ALL | RESERVED | | | | | | | |
| 459-462 | ALL | RESERVED | | | | | | | |
| 463-466 | ALL | RESERVED | | | | | | | |
| 467-470 | ALL | RESERVED | | | | | | | |
| 471-474 | ALL | RESERVED | | | | | | | |
| 475-478 | ALL | RESERVED | | | | | | | |
| 479-482 | ALL | RESERVED | | | | | | | |
| 483-486 | ALL | RESERVED | | | | | | | |
| 487-490 | ALL | RESERVED | | | | | | | |

STORAGE DEVICE ATTRIBUTE STRUCTURE 500

FIG. 5D

PERFORMANCE-BASED WORKLOAD/STORAGE ALLOCATION SYSTEM

BACKGROUND

The present disclosure relates generally to information handling systems, and more particularly to allocating storage for workloads provided in information handling systems based on workload performance requirements of the workloads and performance capabilities of storage devices that provide the storage.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided in a Hyper-Converged Infrastructure (HCI) systems that may be provided by a software-defined Information Technology (IT) infrastructure that virtualizes the elements of "hardware-defined" systems using, for example, virtualized computing subsystems (e.g., a hypervisor subsystem), a virtualized Storage Area Network (SAN) (e.g., "software-defined storage"), and virtualized networking (e.g., "software-defined networking") provided one or more server devices. HCI systems have evolved from conventional discrete, hardware-defined systems that are connected and packaged together to a software-defined environment in which the functional elements are provided via server device(s) and converged via a hypervisor. It is often desirable to utilize the shared operating environment provided in HCI systems in order to perform multiple workloads, but doing so raises a number of issues.

For example, workload provisioning using an HCI system may require the HCI system provide an unpredictable number of workloads that can each require an unpredictable runtime payload. From an HCI storage system standpoint, the HCI system is capable of providing "best-effort" storage/workload allocations that attempt to allocate a particular storage capacity to any particular workload, but that cannot guarantee storage allocated to a workload will meet workload performance requirements for that workload. As such, when aggregated payloads are provided from workload(s) to an HCI storage system, the HCI storage system may drop the session associated with those payloads, fail to perform the payload transaction, and/or operate in some other manners that results in an inability to satisfy the "best effort" storage/workload allocations made by the HCI system.

In a specific example, e-commerce workloads may require purchase/payment transaction operations to be completed in less than 75 milliseconds (ms), and HCI systems supporting such workloads may attempt to satisfy those requirements by allocating the workload to a relatively high performance storage device pool (e.g., a storage device pool made up of Hard Disk Drives (HDDs) or Solid State Drives (SSDs) based on Software Defined Storage (SDS)). However, even the same types of storage devices that may be included in a storage device pool (e.g., Serial Advanced Technology Attachment (SATA) SSDs, Serial Attached Small Computer System Interface (SAS) SSDs, Non-Volatile Memory express (NVMe) SSDs, and/or Persistant MEMory (PMEM) SSDs in an SSD storage device pool) may exhibit dramatic performance variations. As such, workloads with requirements such as the 75 ms purchase/payment transaction operation requirements discussed above are provided on dedicated server devices/systems, and not performed using HCI systems that also operate to provide other workloads. As would be appreciated by one of skill in the art in possession of the present disclosure, the inability to guarantee workload performance requirements by HCI systems limits their utilization in situations where the HCI system is fully capable of providing the workload.

Accordingly, it would be desirable to provide an improved workload/storage allocation system.

SUMMARY

According to one embodiment, an Information Handling System (IHS) includes a processing system; and a memory system that is coupled to the processing system and that includes instructions that, when executed by the processing system, cause the processing system to provide a workload/storage allocation engine that is configured to: identify a first workload that requires storage resources; retrieve at least one first workload performance requirement associated with the first workload; retrieve, via at least one controller device and from a respective storage device attribute structure included in each of a plurality of storage devices, storage device attributes that identify the performance capabilities of each of the plurality of storage devices; determine, based on the storage device attributes, that at least one of the plurality of storage devices includes performance capabilities that satisfy the at least one first workload performance requirement; and allocate, for use with the first workload, the at least one of the plurality of storage devices that includes performance capabilities that satisfy the at least one first workload performance requirement.

BRIEF DESCRIPTION OF THE DRAWINGS

FIG. 5A is a schematic view illustrating an embodiment of a storage device attribute structure that may be provided in the storage device of FIG. 4.

FIG. 5B is a schematic view illustrating an embodiment of a storage device attribute structure that may be provided in the storage device of FIG. 4.

FIG. 5C is a schematic view illustrating an embodiment of a storage device attribute structure that may be provided in the storage device of FIG. 4.

FIG. 5D is a schematic view illustrating an embodiment of a storage device attribute structure that may be provided in the storage device of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
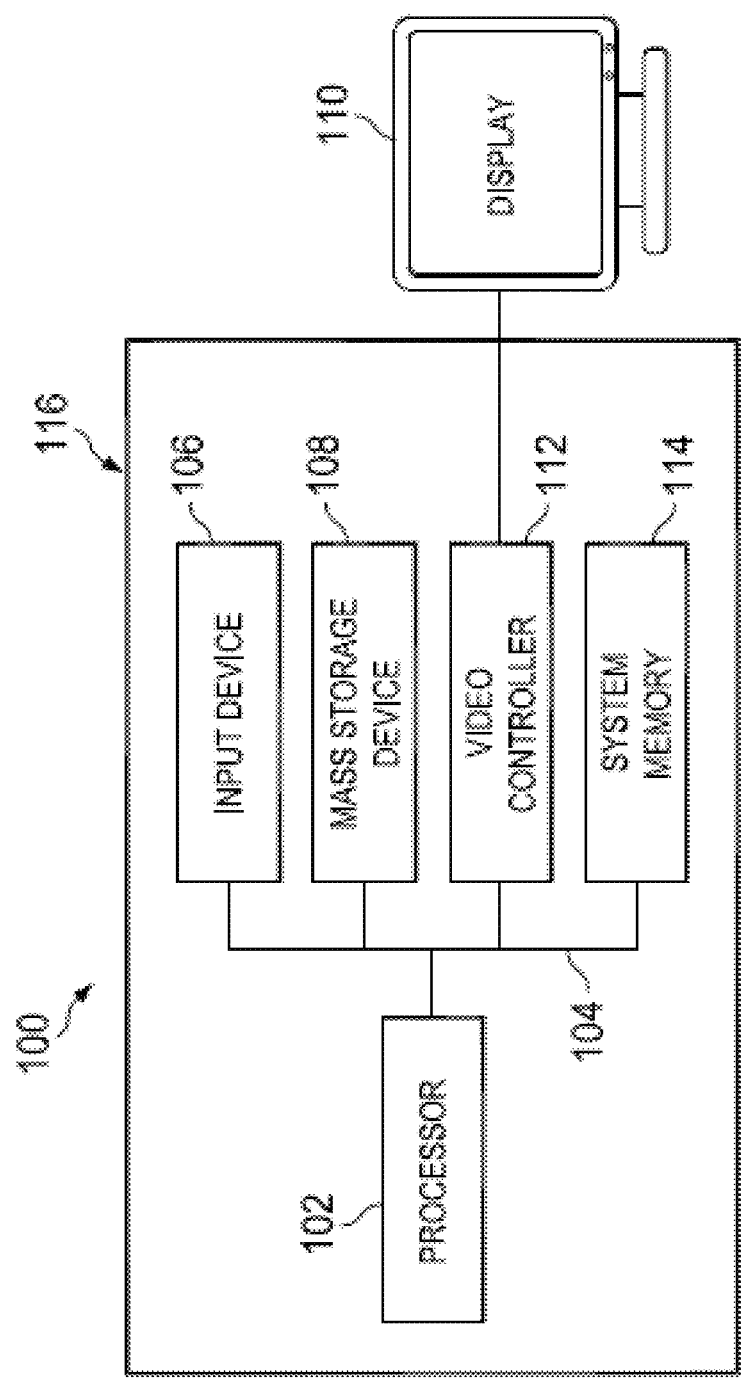
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
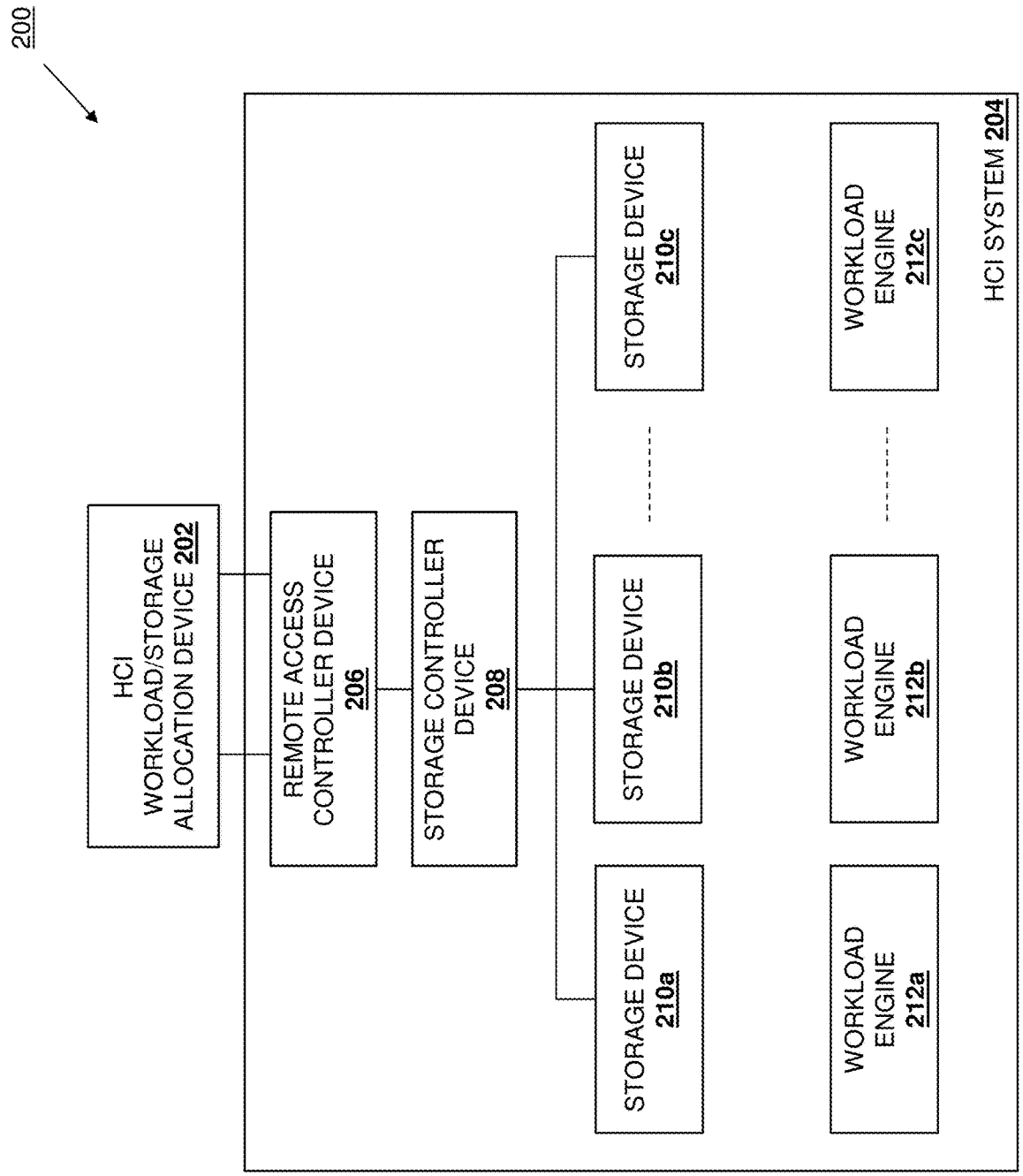
FIG. 2A is a schematic view illustrating an embodiment of a performance-based workload/storage allocation system.
Figure 2B:
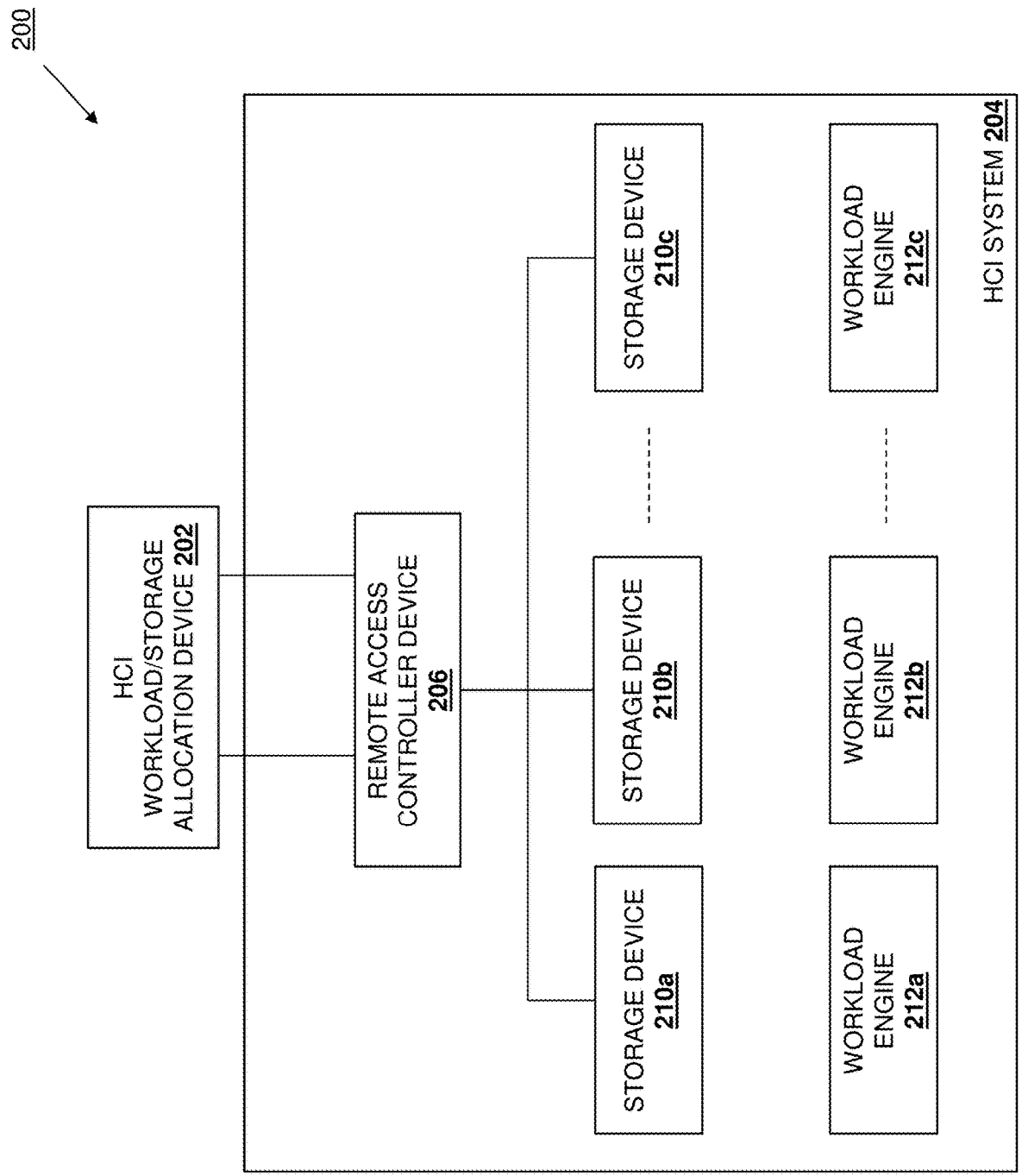
FIG. 2B is a schematic view illustrating an embodiment of a performance-based workload/storage allocation system.

Referring now to FIGS. 2A and 2B, embodiments of a performance-based workload/storage allocation system 200 are illustrated. In the illustrated embodiments, the performance-based workload/storage allocation system 200 incudes a Hyper-Converged Infrastructure (HCI) workload/storage allocation device 202 that, in the examples below, provides for the allocation of storage in an HCI system to workloads. However, one of skill in the art in possession of the present disclosure will recognize that the teachings of the present disclosure may be beneficial to non-HCI systems, and thus the application of the teachings of the present disclosure to those situations will fall within the scope of the present disclosure as well. In an embodiment, HCI workload/storage allocation device 202 may be provided by the IHS 100 discussed above with reference to FIG. 1, and/or may include some or all of the components of the IHS 100. For example, one of skill in the art in possession of the present disclosure will recognize that the HCI workload/ storage allocation device 202 is described below as a server device. However, while illustrated and discussed as a server device, one of skill in the art in possession of the present disclosure will recognize that HCI workload/storage allocation device 202 provided in the performance-based workload/storage allocation system 200 may include any number of server devices and/or other devices that may be configured to operate similarly as the HCI workload/storage allocation device 202 discussed below.

The HCI workload/storage allocation device 202 is coupled to an HCI system 204. As discussed above, the HCI system 204 may include a software-defined Information Technology (IT) infrastructure that virtualizes the elements of "hardware-defined" systems using, for example, virtualized computing subsystems (e.g., a hypervisor subsystem), a virtualized Storage Area Network (SAN) (e.g., "software-defined storage"), and virtualized networking (e.g., "software-defined networking") provided one or more server devices. As such, HCI system 204 may be provided by the IHS 100 discussed above with reference to FIG. 1, may include some or all of the components of the IHS 100, and in specific examples is provided by a plurality of server devices. In the illustrated embodiment, the HCI system 204 includes a remote access controller device 206 that may be provided by an integrated DELL® Remote Access Controller (iDRAC) device, a Baseboard Management Controller (BMC), and/or other remote access controller devices known in the art. As such, one of skill in the art in possession of the present disclosure will recognize that the remote access controller device 206 may be configured as an out-of-band management platform for one or more of the server device(s) that provide the HCI system 202, and may include a dedicated processing system, memory system, and networking system (i.e., separate from similarly components utilized by the server devices), as well as access to the system bus. Thus, in addition to the functionality discussed below, the remote access controller device 206 may perform power management functions, virtual media access functions, remote console management functions (available via a web browser or command line interface), and/or other functionality that allows systems administrators and/or HCI system users to remotely configure the HCI system 204 as if they were sitting at a local console. In a specific example, the remote access controller device 204 may be integrated into a motherboard in the HCI system 204 (e.g., as is the case with the iDRAC discussed in the example above.)

In the embodiment illustrated in FIG. 2A, the remote access controller device 206 is coupled to a storage controller device 208 that may be further coupled to a plurality of storage devices 210a, 210b, and up to 210c. As will be appreciated by one of skill in the art in possession of the present disclosure, the storage devices 210a-210c may be storage devices included in the server device(s) that provide the HCI system 204, and thus may be storage devices utilized to provide the virtualized Storage Area Network (SAN) (e.g., "software-defined storage") in the HCI system 204, discussed above. One of skill in the art in possession of the present disclosure will recognize that the storage devices 210a-210c may be provide in a single tier (i.e., without a cache tier), or may be provided in multiple tiers (e.g., with a cache tier) while remaining within the scope of the present disclosure. In the specific embodiment illustrated in FIG. 2A, the storage devices 210a-210c may lack a direct connection to the remote access controller device 206 (e.g., via the motherboard in which the remote access controller device 206 is integrated), and thus the storage controller device 208 connected to the remote access controller device 206 and the storage devices 210a-210c may be utilized to enable the communications between the remote access controller device 206 and the storage devices 210a-210c discussed below. For example, as will be appreciated by one of skill in the art in possession of the present disclosure, Serial Advanced Technology Attachment (SATA) storage devices and Serial Attached Small Computer System Interface (SAS) storage devices may lack a direct connection (e.g., a sideband connection) to the remote access controller device 206, and thus may utilize the configuration illustrated in FIG. 2A.

In the embodiment illustrated in FIG. 2B, the remote access controller device 206 is directly connected to the plurality of storage devices 210a, 210b, and up to 210c. As discussed above, the storage devices 210a-210c may be storage devices included in the server device(s) that provide the HCI system 204, and thus may be storage devices utilized to provide the virtualized Storage Area Network (SAN) (e.g., "software-defined storage") in the HCI system 204, discussed above. In the specific embodiment illustrated in FIG. 2B, the storage devices 210a-210c include a direct connection to the remote access controller device 206 (e.g., via the motherboard in which the remote access controller device 206 is integrated), and thus the remote access controller device 206 may communicate directly with the storage devices 210a-210c as discussed below without the need for the storage controller device 208. For example, as will be appreciated by one of skill in the art in possession of the present disclosure, Non-Volatile Memory express (NVMe) storage devices may include a direct connection (e.g., a sideband connection) to the remote access controller device 206, and thus may utilize the configuration illustrated in FIG. 2B. Furthermore, one of skill in the art in possession of the present disclosure will recognize that combination of storage device types (e.g., the SATA, SAS, and NVMe storage devices in the examples above) may be utilized in the performance-based workload/storage allocation system 200 of the present disclosure, and thus the both of configurations illustrated in both FIGS. 2A and 2B may be provided in the HCI system 204 to provide the functionality discussed below depending on the storage device type being used.

In either of the embodiments illustrated in FIGS. 2A and 2B, the HCI system 204 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide workload engines 212a, 212b, and up to 212c, each of which is configured to perform the functionality of the workload engines and/or HCI systems discussed below. For example, the processing system may include processors in the server device(s) that provide the HCI system 204, and thus may operate to provide the workload engines 212a-212c that provide the workloads discussed below. However, while the workloads are illustrated and described as being provided by workload engines/server devices/processing systems included in the HCI system 204, one of skill in the art in possession of the present disclosure will recognize that workloads may be provided by workload engines/server devices/processing systems that are outside the HCI system 204 (and that are allocated storage from the HCI system 204 as discussed below) while remaining within the scope of the present disclosure as well. While a specific performance-based workload/storage allocation system 200 has been illustrated and described, one of skill in the art in possession of the present disclosure will recognize that the system of the present disclosure may include a variety of components and component configurations while remaining within the scope of the present disclosure as well.

Figure 3:
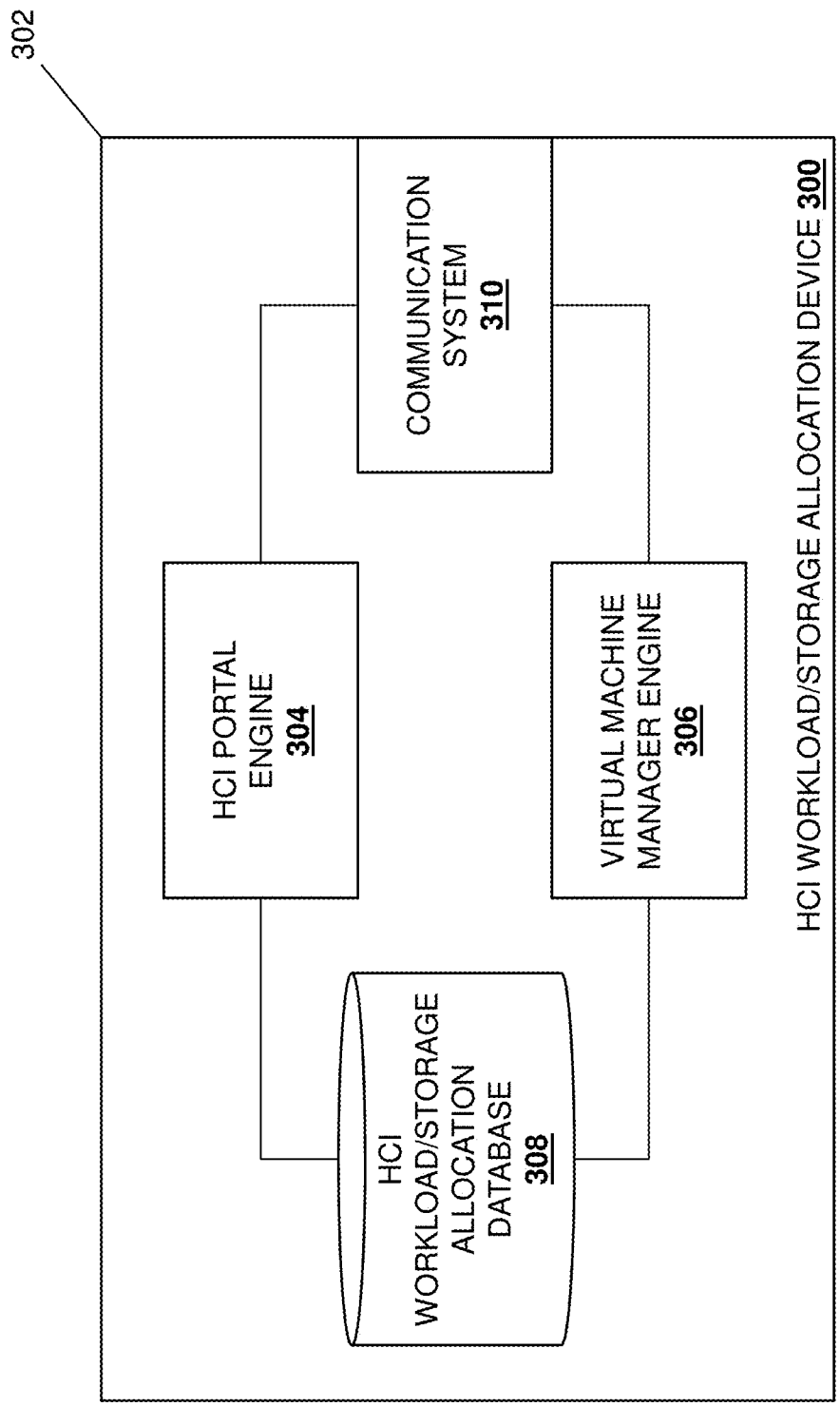
FIG. 3 is a schematic view illustrating an embodiment of an HCI workload/storage allocation device that may be provided in the performance-based workload/storage allocation systems of FIGS. 2A and/or 2B.

Referring now to FIG. 3, an embodiment of an HCI workload/storage allocation device 300 is illustrated that may provide the HCI workload/storage allocation device 202 discussed above with reference to FIGS. 2A and 2B. As such, the HCI workload/storage allocation device 300 may be provided by the IHS 100 discussed above with reference to FIG. 1 and/or may include some or all of the components of the IHS 100. Furthermore, while illustrated and discussed as a server device, one of skill in the art in possession of the present disclosure will recognize that the functionality of the HCI workload/storage allocation device 300 discussed below may be provided by more than one server device, and/or other devices that are configured to operate similarly as the HCI workload/storage allocation device 300 discussed below. In the illustrated embodiment, the HCI workload/storage allocation device 300 includes a chassis 302 that houses the components of the HCI workload/storage allocation device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an HCI portal engine 304 that is configured to perform the functionality of the HCI portal engines and/or HCI workload/storage allocation devices discussed below, as well as a Virtual Machine Manager (VMM) engine 306 that is configured to perform the functionality of the VMM engines and/or HCI workload/storage allocation devices discussed below.

The chassis 302 may also house a storage system (not illustrated, but which may include the storage 108 discussed above with reference to FIG. 1) that is coupled to each of the HCI portal engine 304 and the VMM engine 306 (e.g., via a coupling between the storage system and the processing system) and that includes an HCI workload/storage allocation database 308 that is configured to store any of the information utilized by the HCI portal engine 304 and the VMM engine 306 discussed below. The chassis 302 may also house a communication system 310 that is coupled to each of the HCI portal engine 304 and the VMM engine 306 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. While a specific HCI workload/storage allocation device 300 has been illustrated, one of skill in the art in possession of the present disclosure will recognize that HCI workload/storage allocation devices (or other devices operating according to the teachings of the present disclosure in a manner similar to that described below for the HCI workload/storage allocation device 300) may include a variety of components and/or component configurations for providing conventional HCI workload/storage allocation device functionality, as well as the functionality discussed below, while remaining within the scope of the present disclosure as well.

Figure 4:
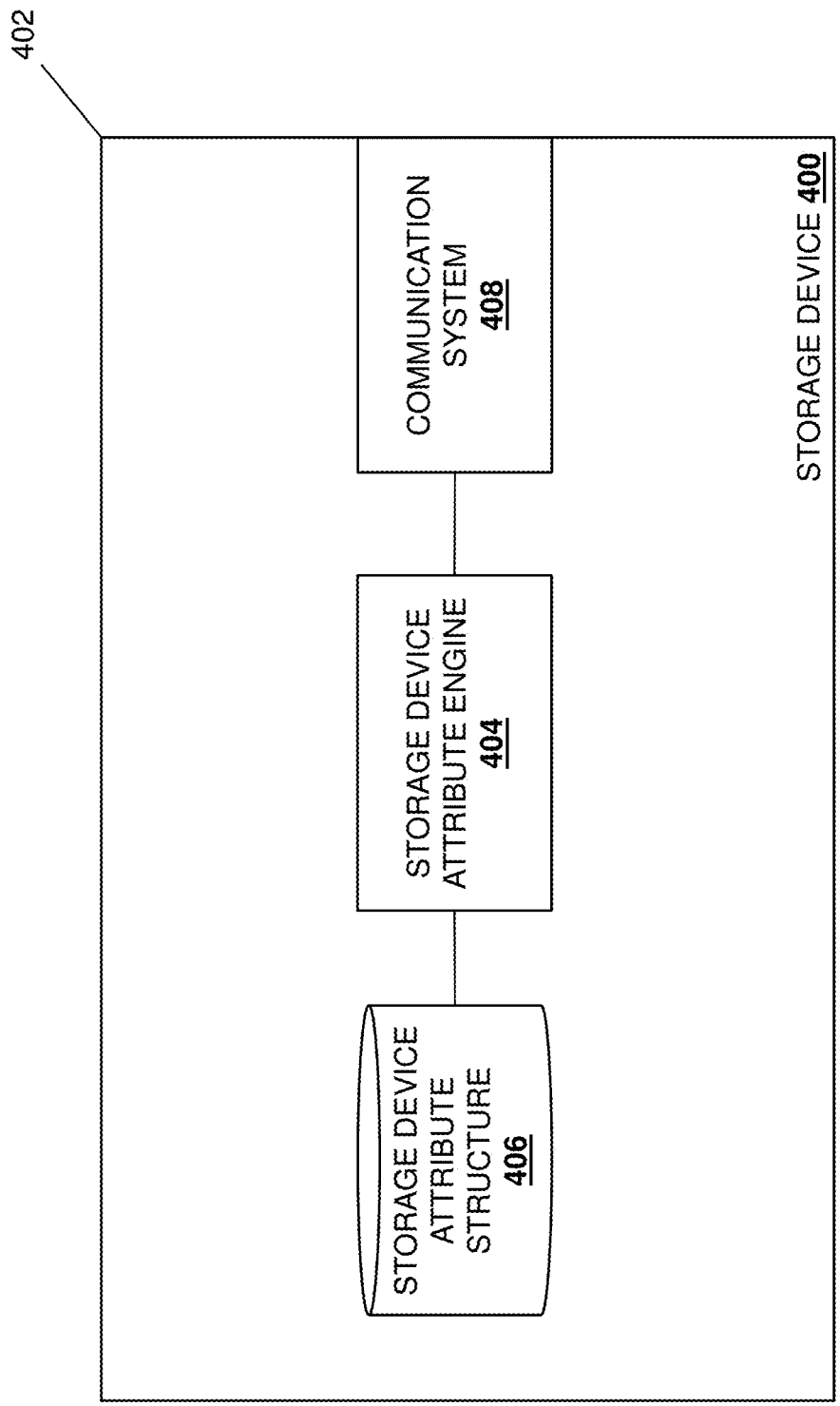
FIG. 4 is a schematic view illustrating an embodiment of a storage device that may be provided in the performance-based workload/storage allocation systems of FIGS. 2A and/or 2B.

Referring now to FIG. 4, an embodiment of a storage device 400 is illustrated that may provide any or all of the storage devices 210a-210c discussed above with reference to FIGS. 2A and 2B. As such, the storage device 400 may be provided in the IHS 100 discussed above with reference to FIG. 1 and/or may provide one of the components of the IHS 100. Furthermore, while illustrated and discussed as a storage device, one of skill in the art in possession of the present disclosure will recognize that the functionality of the storage device 300 discussed below may be provided by portions of a storage device and/or a storage system that are configured to operate similarly as the storage device 400 discussed below. In the illustrated embodiment, the storage device 400 includes a chassis 402 that houses the components of the storage device 400, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an storage device attribute engine 404 that is configured to perform the functionality of the storage device attribute engines and/or storage devices discussed below. As discussed below, in some examples, the storage device attribute engine 404 may be configured to push the storage device attributes discussed below to the HCI workload/storage allocation device 202. However, one of skill in the art in possession of the present disclosure will recognize that such functionality may require a relatively complex processing system and, as such, in other embodiments the storage device attribute engine 404 may be omitted, or may be replaced by circuitry or other subsystems that allow the storage device attributes to be pulled from the storage device 400 in the manner described below.

The chassis 402 may also house a storage subsystem (not illustrated, but which may include a portion of the storage 108 discussed above with reference to FIG. 1) that is coupled to each of the storage device attribute engine 404 (e.g., via a coupling between the storage system and the processing system) and that includes a storage device attribute structure 406 that is configured to store storage device attributes discussed below. However, as discussed above, in some embodiments the storage device attribute engine 404 may be omitted, or may be replaced by circuitry or other subsystems that allow the storage device attributes to be pulled from the storage device 400 in the manner described below, and thus the storage device attribute structure 406 may be coupled to those subsystems/that circuitry as well. The chassis 302 may also house a communication system 408 that is coupled to the storage device attribute engine 404 (e.g., via a coupling between the communication system 408 and the processing system) or directly to the storage device attribute structure 406, and that may be provided by any storage device communication components that would be apparent to one of skill in the art in possession of the present disclosure. While a specific storage device 400 has been illustrated, one of skill in the art in possession of the present disclosure will recognize that storage devices (or other devices and/or storage subsystems operating according to the teachings of the present disclosure in a manner similar to that described below for the storage device 400) may include a variety of components and/or component configurations for providing conventional storage device functionality, as well as the functionality discussed below, while remaining within the scope of the present disclosure as well.

Referring now to FIGS. 5A, 5B, 5C, and 5D, an embodiment of a storage device attribute structure 500 is illustrated that may be the storage device attribute structure 406 included in the storage device 400 discussed above with reference to FIG. 4. As such, a storage device attribute structure similar to the storage device attribute structure 500 may be included in each of the storage devices 210a-210c illustrated in FIGS. 2A and 2B (and may include storage devices attributes determined for that particular storage device as discussed below.) In some embodiments, the manufacturer and/or other provider of the storage device 400/210a-210c may utilize the storage device structure 406/500 to provide any of the storage device attributes discussed below. For example, any manufacturer and/or other provider of any of the storage device 210a-210c/400 may determine storage device primitive information about that storage device that may include, for example, information about/associated with the basic hardware utilized in that storage device, and may include that storage device primitive information in the storage device attribute structure 500 for that storage device. Furthermore, any manufacturer and/or other provider of any of the storage device 400/210a-210c may perform a variety of testing on that storage device in order to measure and confirm any of a variety of storage device performance capability information that describes the performance capabilities of that storage device, and may include that storage device performance capability information in the storage device attribute structure 500 for that storage device.

As will be appreciated by one of skill in the art in possession of the present disclosure, the performance capabilities of a storage device may change when firmware utilized by the storage device is updated. For example, primitive details of basic hardware provided in a storage device may provide performance capabilities for a storage device, and different firmware versions may change those performance capabilities. As such, for any firmware update for a storage device, the storage device manufacturers or other storage device providers may determine the firmware-updated performance capabilities of any storage device utilizing that updated firmware, and may provide a storage attribute update in that firmware update that operates to update the storage attributes in the storage attribute structure in order to identify the firmware-updated performance capabilities of the storage device when that storage devices utilizes the updated firmware.

In particular, the measurement and confirmation of any storage device performance capability information that describes the performance capabilities of a storage device may include defining a "worst case" performance capability that is included as worst case performance capability information in the storage device attribute structure 500 for that storage device and that identifies the minimum performance level of that storage device, which as discussed below may be considered the guaranteed performance level for that storage device. Furthermore, the measurement and confirmation of any storage device performance capability information that describes the performance capabilities of a storage device may include defining a "best case" performance capability that is included as best case performance capability information in the storage device attribute structure 500 for that storage device and that identifies the maximum performance level of that storage device, and that may be utilized for oversubscription/allocation of the storage resources and/or for use in obtaining the highest Return On Investment (ROI) for the storage resources (i.e., allocating those unguaranteed high-performance storage resources to workloads that pay the highest price for them.) Further still, the measurement and confirmation of any storage device performance capability information that describes the performance capabilities of a storage device may include defining an "average case" performance capability that is included as average case performance capability information in the storage device attribute structure 500 for that storage device and that identifies the performance level of that storage device between its minimum performance level and its maximum performance level. However, while a few specific examples have been described, one of skill in the art in possession of the present disclosure will recognize that performance capabilities of a storage device may be measured, confirmed, and/or other determined and defined in a variety of manners that will fall within the scope of the present disclosure as well.

As will be appreciated by one of skill in the art in possession of the present disclosure, the example of the storage device attribute structure 500 illustrated in FIGS. 5A-5D provides a storage device attribute structure that may be utilized by a SAS storage device. However, one of skill in the art in possession of the present disclosure will recognize that storage device attribute structures for SATA storage devices, NVMe storage devices, and/or other storage devices may utilize different storage attributes that will fall within the scope of the present disclosure as well. Furthermore, while common block size configurations are provided in the storage device attribute structure 500 illustrated in FIGS. 5A-5D, one of skill in the art in possession of the present disclosure will recognize that a variety of different block size configurations may be provided while remaining within the scope of the present disclosure as well. As can be seen in FIG. 5A, the storage device attribute structure 500 includes a variety of storage device attributes for the storage device in which it is provided (e.g., by the manufacturer or other provider of the storage device, as discussed above), including a product identifier provided in bytes 12-27 of the storage device attribute structure 500, a nominal form factor height and width provided in bytes 76-79 and bytes 80-83 of the storage device attribute structure 500, a motor serial number provided in bytes 148-163 of the storage device attribute structure 500 (each of which may be expressed in American Standard Code for Information Interchange (ASCII) in the storage device attribute structure 500), as well as a variety of other storage device attributes. As can also be seen in FIG. 5B, the storage device attribute structure 500 also includes a variety of storage device attributes for the storage device in which it is provided (e.g., by the manufacturer or other provider of the storage device, as discussed above), including details about the date of manufacture of the storage device provided in bytes 244-247, 248-249, and 250-251 of the storage device attribute structure 500, a flash silicon supplier in bytes 298-305 of the storage device attribute structure 500, details about the SSD mechanical assembly provided in bytes 322-337 of the storage device attribute structure 500 (each of which may be expressed in ASCII in the storage device attribute structure 500), as well as a variety of other storage device attributes.

Furthermore, the storage device attribute structure 500 includes a variety of performance capability information provided as storage device attributes. As will be appreciated by one of skill in the art in possession of the present disclosure, storage device performance capability may depend on a block size utilized by the storage device, and thus the example below provides storage device attributes that identify performance capabilities based on different block sizes utilized for the storage device. However, one of skill in the art in possession of the present disclosure will recognize that storage device performance capabilities may be expressed in a variety of manners that will fall within the scope of the present disclosure as well. In the example illustrated in FIGS. 5B, 5C, and 5D, a first block size (e.g., a 512 byte block size) is identified at byte 342, and that first block size is associated with performance capability information storage device attributes that include a worst/average/best case Input/output Operations Per Second (IOPS) for the storage device at that first block size in bytes 343-346, 347-350, and 351-354 of the storage device attribute structure 500, a worst/average/best case throughput for the storage device at that first block size in bytes 355-358, 359-362, 363-366 of the storage device attribute structure 500, and a worst/average/best case latency for the storage device at that first block size in bytes 367-370, 371-374, 375-378 of the storage device attribute structure 500, with each of the performance capability information storage device attributes in the illustrated embodiment expressed in single precision Floating Point (FP) in the storage device attribute structure 500 (although other means for expressing the performance capability information provided as storage device attributes will fall within the scope of the present disclosure as well.)

Similarly, a second block size (e.g., a 4000 byte (4 KB) block size) is identified at byte 380, and that second block size is associated with performance capability information storage device attributes that include a worst/average/best case Input/output Operations Per Second (IOPS) for the storage device at that second block size in bytes 381-382, 383-386, and 387-390 of the storage device attribute structure 500, a worst/average/best case throughput for the storage device at that second block size in bytes 391-394, 395-398, and 399-402 of the storage device attribute structure 500, and a worst/average/best case latency for the storage device at that second block size in bytes 403-406, 407-410, and 411-414 of the storage device attribute structure 500, with each of the performance capability information storage device attribute in the illustrated embodiment expressed in single precision FP in the storage device attribute structure 500 (although other means for expressing the performance capability information provided as storage device attributes will fall within the scope of the present disclosure as well.)

Similarly, a third block size (e.g., a 8000 byte (8 KB) block size) is identified at byte 416, and that third block size is associated with performance capability information storage device attributes that include a worst/average/best case Input/output Operations Per Second (IOPS) for the storage device at that third block size in bytes 417-420, 421-424, and 425-428 of the storage device attribute structure 500, a worst/average/best case throughput for the storage device at that third block size in bytes 429-432, 433-436, and 437-440 of the storage device attribute structure 500, and a worst/average/best case latency for the storage device at that third block size in bytes 441-444, 445-448, and 449-452 of the storage device attribute structure 500, with each of the performance capability information storage device attribute in the illustrated embodiment expressed in single precision FP in the storage device attribute structure 500 (although other means for expressing the performance capability information provided as storage device attributes will fall within the scope of the present disclosure as well.) One of skill in the art in possession of the present disclosure will recognize that the 8 KB block size example provided above is not common, but may be utilized in the future due to the ever-increasing capacity of storage devices.

While several specific examples of a storage device attribute structure and storage device attributes for a SAS storage device have been described, one of skill in the art in possession of the present disclosure will recognize that any of a variety of performance capability information that describes performance characteristics of the storage device may be included in the storage device attribute structure 500 while remaining within the scope of the present disclosure as well. As such, it should be understood that storage device attribute structures and storage device attributes for the SATA storage devices and NVMe storage devices discussed above may be provided in a similar manner while remaining within the scope of the present disclosure as well.

Figure 6:
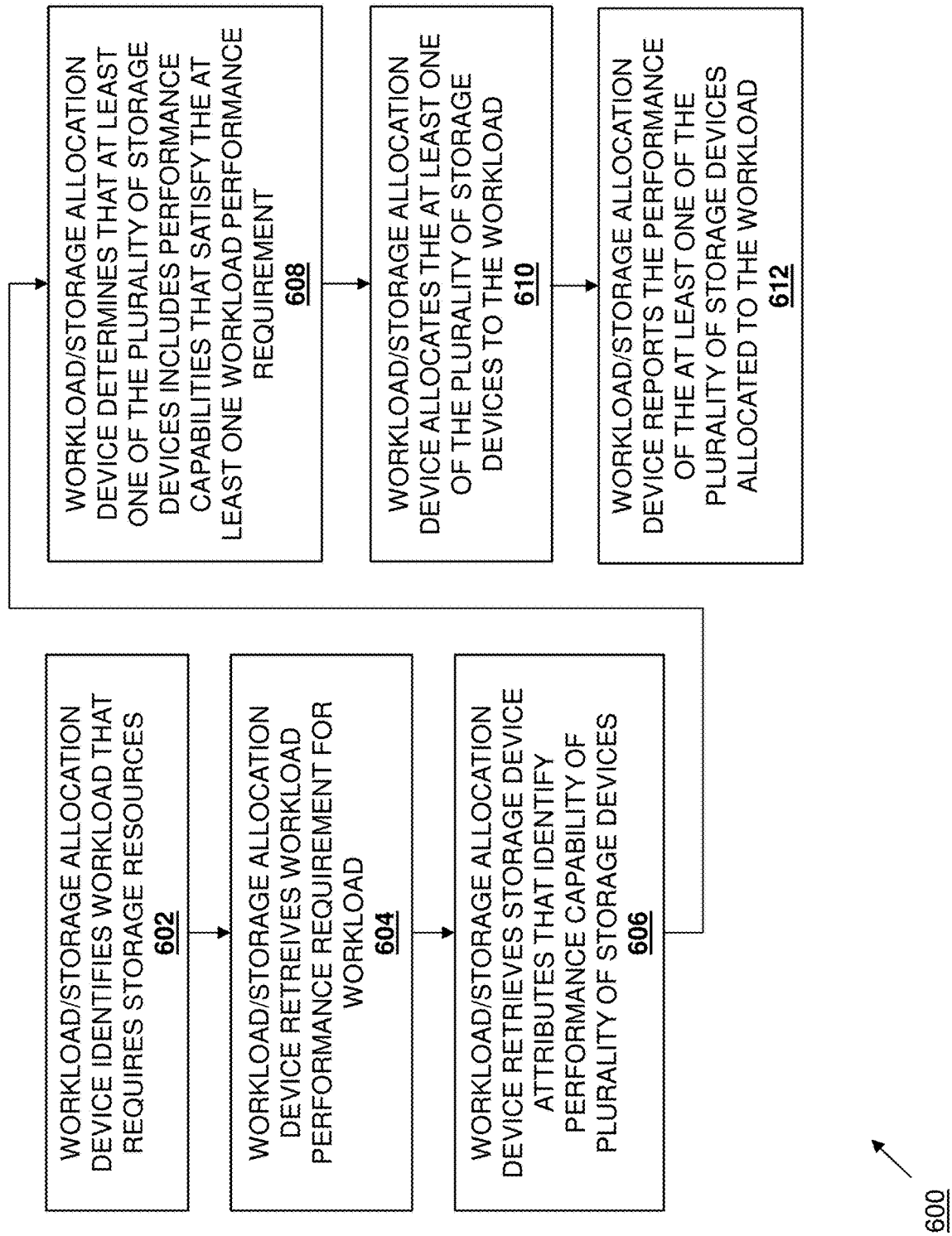
FIG. 6 is a flow chart illustrating an embodiment of a method for performance-based allocation of storage for workloads.

Referring now to FIG. 6, an embodiment of a method 600 for performance-based allocation of storage for workloads is illustrated. As discussed below, the systems and methods of the present disclosure provide for the allocation of storage to workloads in consideration of the actual/absolute performance capabilities of the storage devices providing that storage and in a manner that guarantees the storage allocation will satisfy performance requirements for the workloads. A workload/storage allocation device may identify a workload that requires storage resources, and retrieve workload performance requirement(s) associated with that workload The workload/storage allocation device then retrieves the storage device attributes that identify the performance capabilities of each of the plurality of storage devices from their respective storage device attribute structure, and uses those performance capabilities to determine that at least one of the plurality of storage devices includes performance capabilities that satisfy the workload performance requirement(s). The workload/storage allocation device may then allocate the at least one of the plurality of storage devices for use with the workload. As such, multiple workloads may be allocated storage from an HCI system while ensuring/guaranteeing that those workloads will operate according to minimum performance levels that satisfy their workload performance requirements.

Figure 7A:
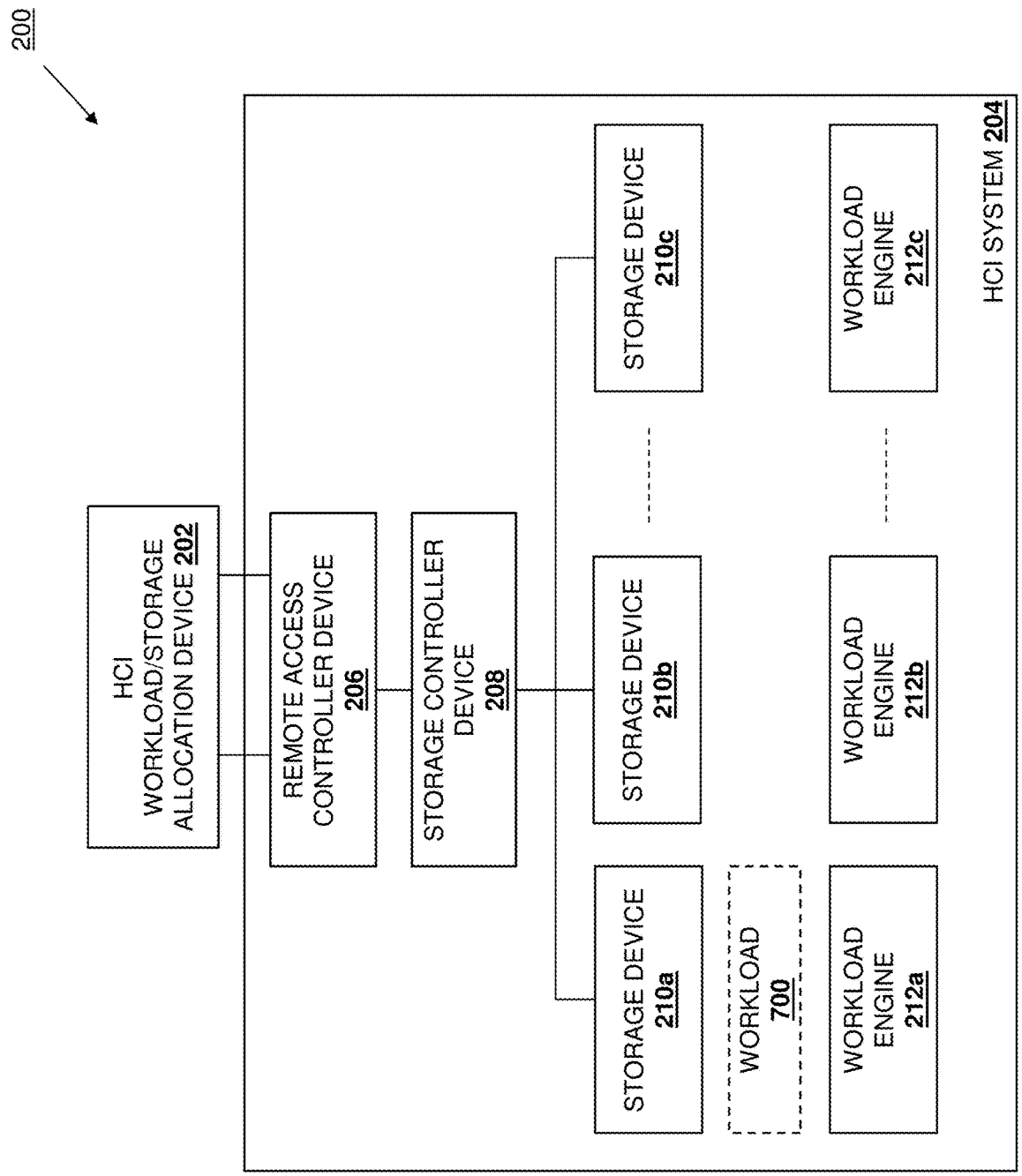
FIG. 7A is a schematic view illustrating an embodiment of the performance-based workload/storage allocation system of FIG. 2A operating during the method of FIG. 6.
Figure 8A:
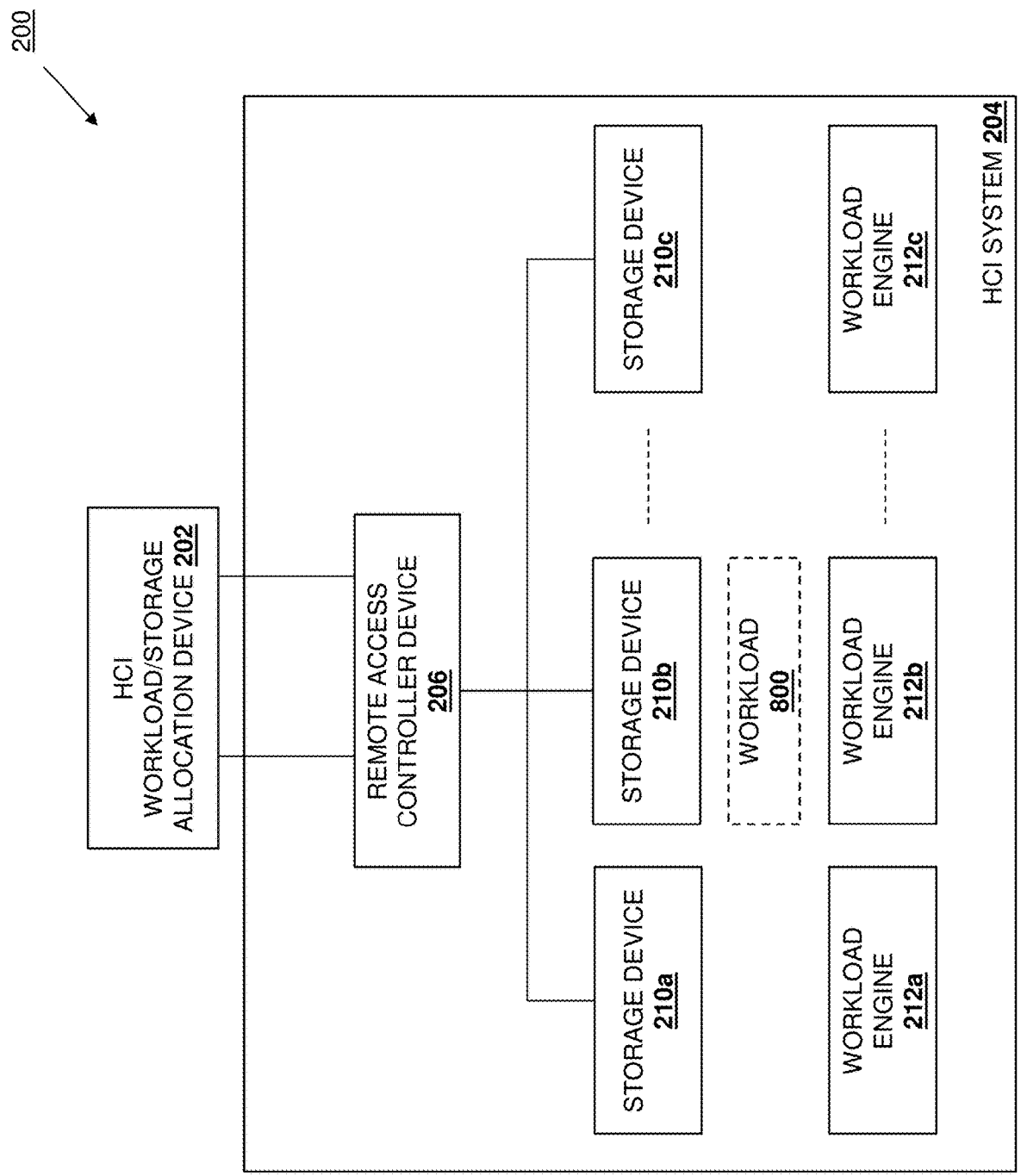
FIG. 8A is a schematic view illustrating an embodiment of the performance-based workload/storage allocation system of FIG. 2B operating during the method of FIG. 6.

The method 600 begins at block 602 where a workload/storage allocation device identifies a workload that requires storage resources. As illustrated in FIG. 7A, in an embodiment of block 602, the workload engine 212a may operate to provide a workload 700 that requires storage resources and, in response, the HCI workload/storage allocation device 202 may identify the workload 700. Similarly, as illustrated in FIG. 8A, in an embodiment of block 602 the workload engine 212b may operate to provide a workload 800 that requires storage resources and, in response, the HCI workload/storage allocation device 202 may identify the workload 700. While illustrated as being provided separately, one of skill in the art in possession of the present disclosure will recognize that each of the workloads 700 and 800 (as well as additional workloads) may be provided simultaneously while remaining within the scope of the present disclosure. Furthermore, while the workloads 700 and 800 are illustrated and described as being provided by the HCI system 204, one of skill in the art in possession of the present disclosure will recognize that workloads may be provided outside of the HCI system 204 and may be allocated storage from the HCI system 204 (similarly as described below for the workloads 700 and 800) while remaining within the scope of the present disclosure as well. In an embodiment, the identification of the workloads 700 and 800 by the HCI workload/storage allocation device 202/300 may be performed by the HCI portal engine 304 and/or the VMM engine 306, and may include communications between the workloads 700 and 800 and the HCI workload/storage allocation device 202 (e.g., via the communication system 310) that may involve a variety of communication techniques that result in the identification of the workloads 700 and 800, and/or the workloads 700 and 800 identifying themselves.

The method 600 then proceeds to block 604 where the workload/storage allocation device retrieves workload performance requirement(s) for the workload. In an embodiment, at block 604, the HCI portal engine 304 and/or the VMM engine 306 in the HCI workload/storage allocation device 202/300 may operate to use the identity of the workload determined at block 602 in order to access the HCI workload/storage allocation database 308 and retrieve workload performance requirement(s) associated with that workload. As will be appreciated by one of skill in the art in possession of the present disclosure, for any workload that is to be allocated storage resources included in the HCI system 204, an administrator or other HCI system user may identify that workload and its workload performance requirement(s) in the HCI workload/storage allocation database 308. For example, a workload provider (e.g., the developer of the workload) may detail the workload performance requirements for any workload it provides, and an administrator or other HCI system user may utilize the HCI portal engine 304 and/or the VMM engine 306 in the HCI workload/storage allocation device 202/300 in order to enter the workload performance requirements detailed by the workload provider in the HCI workload/storage allocation database 308. However, while a specific example has been provided, one of skill in the art in possession of the present disclosure will recognize that workload performance requirements may be provided in the HCI workload/storage allocation database 308 in a variety of manners (e.g., via the determination of those workload performance requirements from previous uses of the workload) while remaining within the scope of the present disclosure as well.

As such, at block 604, the HCI portal engine 304 and/or the VMM engine 306 in the HCI workload/storage allocation device 202/300 may operate to use the identity of the workload 700 determined at block 602 in order to access the HCI workload/storage allocation database 308 and retrieve workload performance requirement(s) associated with the workload 700, which may include the transaction performance requirement discussed above that requires that purchase/payment transaction operations to be completed in less than 75 milliseconds. Similarly, at block 604, the HCI portal engine 304 and/or the VMM engine 306 in the HCI workload/storage allocation device 202/300 may operate to use the identity of the workload 800 determined at block 602 in order to access the HCI workload/storage allocation database 308 and retrieve workload performance requirement(s) associated with the workload 800, which may include any workload performance requirement that would be apparent to one of skill in the art in possession of the present disclosure. However, while two specific examples of workload performance requirements have been described, one of skill in the art in possession of the present disclosure will recognize that many workloads (e.g., enterprise-class workloads) include variety of absolute performance requirements that, if not met, will cause those workloads to be dropped, and any of those performance requirements will fall within the scope of the present disclosure as well.

The method 600 then proceeds to block 606 where the workload/storage allocation device retrieves storage device attributes that identify performance capabilities of a plurality of storage devices. In an embodiment, at block 606, the HCI portal engine 304 and/or the VMM engine 306 in the HCI workload/storage allocation device 202/300 may operate to retrieve storage device attributes from each of the storage devices 210a, 210b, and up to 210c. For example, with reference to the embodiment of the performance-based workload/storage allocation system 200 illustrated in FIG. 2A, the HCI portal engine 304 and/or the VMM engine 306 in the HCI workload/storage allocation device 202/300 may use the communication system 310 to access the storage devices 210a, 210b, and up to 210c via the remote access controller device 206 and the storage controller device 208, and may retrieve any or all of the storage device attributes included in the storage device structure 406 in the storage devices 210a-210c/400 (i.e., via its communication system 408.) In a specific example, the HCI portal engine 304 and/or the VMM engine 306 in the HCI workload/storage allocation device 202/300 may communicate with host-level agent(s) in hypervisor(s) provided in the server device(s) that include the storage device 210a-210c in order to access the storage device attributes of those storage devices 210a-210c.

Similarly, with reference to the embodiment of the performance-based workload/storage allocation system 200 illustrated in FIG. 2B, the HCI portal engine 304 and/or the VMM engine 306 in the HCI workload/storage allocation device 202/300 may use the communication system 310 to access the storage devices 210a, 210b, and up to 210c via the remote access controller device 206, and may retrieve any or all of the storage device attributes included in the storage device structure 406 in the storage devices 210a-210c/400 (i.e., via its communication system 408.) As discussed above, the HCI portal engine 304 and/or the VMM engine 306 in the HCI workload/storage allocation device 202/300 may communicate with host-level agent(s) in hypervisor(s) provided in the server device(s) that include the storage device 210a-210c in order to access the storage device attributes of those storage devices 210a-210c. However, while the storage device attributes are discussed as being retrieved or "pulled" from the storage devices 210a, 210b, and up to 210c, one of skill in the art in possession of the present disclosure will recognize that the storage devices 210a-210c/400 may include a storage device attribute engine 404 that is configured to provide or "push" the storage device attributes to the HCI portal engine 304 and/or the VMM engine 306 in the HCI workload/storage allocation device 202/300 while remaining within the scope of the present disclosure as well.

As will be appreciated by one of skill in the art in possession of the present disclosure, in some embodiments of block 606, the HCI workload/storage allocation device 202 may only retrieve storage device attributes from a subset of the storage devices 210a, 210b, and up to 210c. For example, in some embodiments, some of the storage devices 210a, 210b, and up to 210c may have all of their storage resources currently allocated to workloads and, as such, those storage devices are not available for allocation to a workload, and the HCI workload/storage allocation device 202 may not retrieve storage device attributes from those storage devices at block 606. Furthermore, in some embodiments of block 606, the HCI workload/storage allocation device 202 may only retrieve particular storage device attributes from the storage devices 210a, 210b, and up to 210c. For example, one of skill in the art in possession of the present disclosure will recognize that some of the storage device attributes in the storage device attribute structure 500 illustrated in FIGS. 5A-5D may not be needed for any particular workload/storage allocation, and thus the HCI workload/storage allocation device 202 may not retrieve those storage device attributes from those storage devices at block 606.

In yet another example, any particular storage device may utilize a particular block size, and thus the HCI workload/storage allocation device 202 may only be concerned with performance capability information storage device attributes associated with that particular block size utilized by the storage device (e.g., the performance capability information storage device attributes associated with the 512 byte block size) at block 606. In another example, the HCI workload/storage allocation device 202 may only be concerned with providing a guaranteed performance level to the workload, and thus may only retrieve performance capability information storage device attributes associated with minimum performance capabilities of the storage device (e.g., the worst-case performance capabilities) at block 606. However, while several examples have been provided, one of skill in the art in possession of the present disclosure will recognize that different subsets of storage device attributes included in a storage device attribute structures for storage devices may be retrieved for a variety of different use cases that will fall within the scope of the present disclosure as well.

The method 600 then proceeds to block 608 where the workload/storage allocation device determines that at least one of the plurality of storage devices includes performance capabilities that satisfy the at least one workload requirement. With reference to FIG. 7A, in an embodiment of block 608, the HCI portal engine 304 and/or the VMM engine 306 in the HCI workload/storage allocation device 202/300 may operate to determine that at least one of the plurality of storage devices 210a, 210b, and up to 210c includes performance capabilities that satisfy the workload performance requirements of the workload 700. With reference to FIG. 8A, in an embodiment of block 608, the HCI portal engine 304 and/or the VMM engine 306 in the HCI workload/storage allocation device 202/300 may operate to determine that at least one of the plurality of storage devices 210a, 210b, and up to 210c includes performance capabilities that satisfy the workload performance requirements of the workload 800.

As will be appreciated by one of skill in the art in possession of the present disclosure, the determination by the HCI workload/storage allocation device 202 that any of the plurality of storage devices 210a-210c includes performance capabilities that satisfy the at least one workload requirement of a workload may include the HCI workload/storage allocation device 202 considering any performance capability identified in the storage device attributes retrieved from that storage device, as well as any combination of performance capabilities identified in the storage device attributes retrieved from that storage device. For example, the HCI workload/storage allocation device 202 may consider one of IOPS, throughput, or latency performance capabilities identified in storage device attributes retrieved from a storage device in order to determine whether that storage device satisfies performance requirements for a workload. In another example, the HCI workload/storage allocation device 202 may consider each of IOPS, throughput, or latency performance capabilities identified in storage device attributes retrieved from a storage device in order to determine whether that storage device satisfies performance requirements for a workload. In yet another example, the HCI workload/storage allocation device 202 may consider any combination of IOPS, throughput, or latency performance capabilities identified in storage device attributes retrieved from a storage device in order to determine whether that storage device satisfies performance requirements for a workload.

Furthermore, as discussed above, in some situations the satisfaction of workload requirement(s) for a workload may only be concerned with a guaranteed performance level, and thus the HCI workload/storage allocation device 202 may consider any combination of worst-case IOPS, worst-case throughput, and/or worst-case latency performance capabilities identified in storage device attributes retrieved from a storage device in order to determine whether that storage device satisfies minimum performance requirements for a workload. However, while several specific examples have been described, one of skill in the art in possession of the present disclosure will recognize that any of a variety of performance capabilities (including those other than IOPS, throughput, and latency) may be considered in any combination to determine whether a storage device satisfies workload performance requirements for a workload while remaining within the scope of the present disclosure as well.

As such, continuing with the example provided above, the HCI portal engine 304 and/or the VMM engine 306 in the HCI workload/storage allocation device 202/300 may determine that the storage device 210a includes performance capabilities that satisfy the workload performance requirement(s) associated with the workload 700, which may include the transaction performance requirement discussed above that requires that purchase/payment transaction operations to be completed in less than 75 milliseconds. Similarly, the HCI portal engine 304 and/or the VMM engine 306 in the HCI workload/storage allocation device 202/300 may determine that the storage device 210c includes performance capabilities that satisfy the workload performance requirement(s) associated with the workload 800, which may include any workload performance requirement that would be apparent to one of skill in the art in possession of the present disclosure. However, while a single storage device is illustrated and described as being determined to have performance capabilities that satisfy workload performance requirements for the workload 700 and 800, one of skill in the art in possession of the present disclosure will recognize that portions of a storage device, multiple storage devices, and/or any other combinations of storage resources provided by one or more storage devices may be determined to have performance capabilities that satisfy workload performance requirements for a workload while remaining within the scope of the present disclosure as well.

Figure 7B:
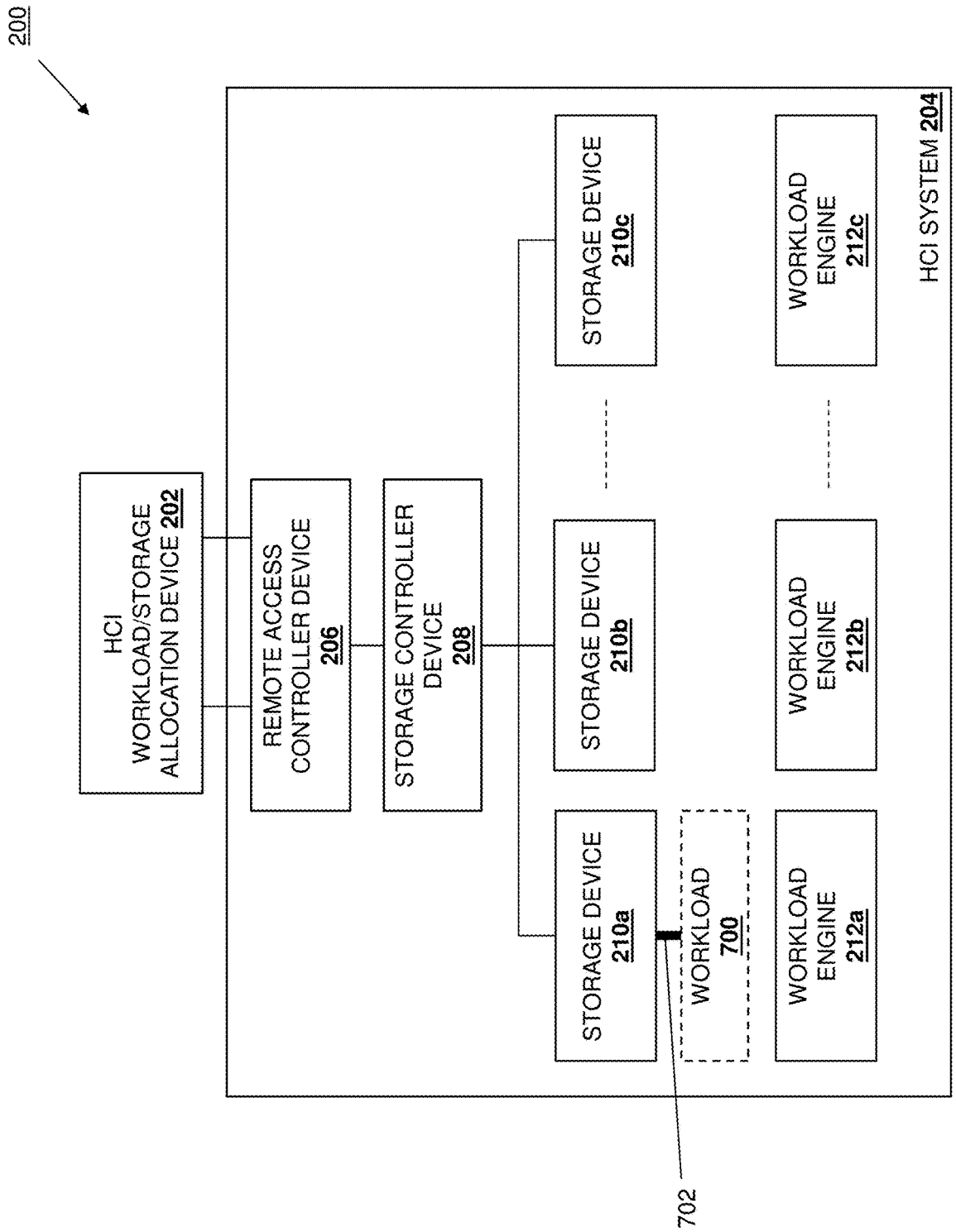
FIG. 7B is a schematic view illustrating an embodiment of the performance-based workload/storage allocation system of FIG. 2A operating during the method of FIG. 6.
Figure 8B:
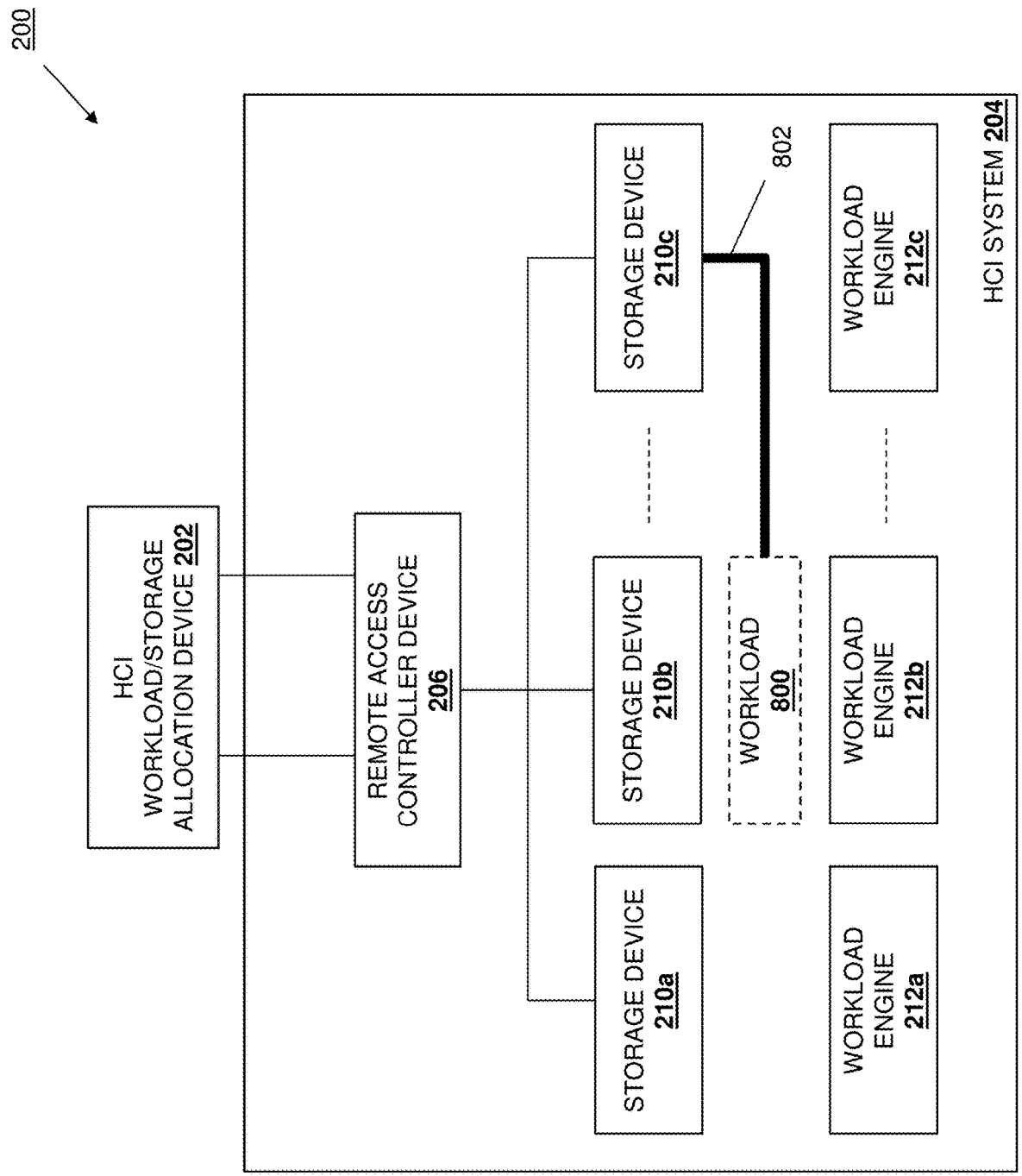
FIG. 8B is a schematic view illustrating an embodiment of the performance-based workload/storage allocation system of FIG. 2B operating during the method of FIG. 6.

The method 600 then proceeds to block 610 where the workload/storage allocation device allocates the at least one of the plurality of storage devices to the workload. With reference to FIG. 7B, in an embodiment of block 610, the HCI portal engine 304 and/or the VMM engine 306 in the HCI workload/storage allocation device 202/300 may operate to allocate the storage device 210a for use by the workload 700 (e.g., as indicated by the link 702 illustrated in FIG. 7B). Similarly, with reference to FIG. 8B, in an embodiment of block 610, the HCI portal engine 304 and/or the VMM engine 306 in the HCI workload/storage allocation device 202/300 may operate to allocate the storage device 210c for use by the workload 800 (e.g., as indicated by the link 802 illustrated in FIG. 8B). However, similarly as discussed above, while a single storage device is illustrated and described as being allocated to the workload 700 and 800, one of skill in the art in possession of the present disclosure will recognize that portions of a storage device, multiple storage devices, and/or any other combinations of storage resources provided by one or more storage devices may be allocated to a workload while remaining within the scope of the present disclosure as well. As such, the workload/storage allocation device 202/300 may be provided the absolute performance capabilities of the storage devices available for allocation to workloads, and may allocate storage devices to workloads based on the absolute performance capabilities of storage devices satisfying the absolute performance requirements of workloads.

The method 600 then proceeds to block 612 where the workload/storage allocation device reports the performance of the at least one of the plurality of storage devices allocated to the workload. In an embodiment, at block 612 and following any allocation of storage device(s) to workload(s), the HCI portal engine 304 and/or the VMM engine 306 in the HCI workload/storage allocation device 202/300 may operate to monitor the use by the workload of the storage device(s) that they were allocated, and determine the performance of those storage device(s) when used by the workload. Following the determination of the performance of the storage device(s), the HCI portal engine 304 and/or the VMM engine 306 in the HCI workload/storage allocation device 202/300 may report the performance of the storage device(s). For example, at block 612, the HCI portal engine 304 and/or the VMM engine 306 in the HCI workload/storage allocation device 202/300 may determine that a storage device is not satisfying workload performance requirements for a workload and, in response, may generate and transmit a communication to an administrator or other HCI system user that reports the failure to satisfy the workload performance requirements for that workload. However, while a specific example has been provided, one of skill in the art in possession of the present disclosure will recognize that the monitoring, determination, and reporting of any level of performance by any storage device used by a workload will fall within the scope of the present disclosure as well.

Thus, systems and methods have been described that provide for the allocation of storage to workloads in consideration of the actual/absolute performance capabilities of the storage devices providing that storage and in a manner that guarantees the storage allocation will satisfy performance requirements for the workloads. A workload/storage allocation device may identify a workload that requires storage resources, and retrieve workload absolute performance requirement(s) associated with that workload The workload/storage allocation device then retrieves the storage device attributes that identify the absolute performance capabilities of each of the plurality of storage devices from their respective storage device attribute structure, and uses those absolute performance capabilities to determine that at least one of the plurality of storage devices includes absolute performance capabilities that satisfy the workload absolute performance requirement(s). The workload/storage allocation device may then allocate the at least one of the plurality of storage devices for use with the workload. As such, multiple workloads may be allocated storage from an HCI system while ensuring/guaranteeing that those workloads will operate according to minimum levels that satisfy their workload absolute performance requirements, rather than requiring a dedicated storage system for workloads that require guaranteed storage performance.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A performance-based workload/storage allocation system, comprising:
    a plurality of storage devices that each include a respective storage device attribute structure that stores storage device attributes that identify storage device primitive information that includes primitive details of hardware in that storage device that effect performance capabilities of that storage device based on a firmware version on that storage device, and current firmware-based minimum performance capabilities of that storage device that were determined for that storage device based on a current version of firmware on that storage device and provided in that storage device in a firmware update with the current version of the firmware;
    at least one controller device coupled to the plurality of storage devices; and
    a workload/storage allocation device that is coupled to the plurality of storage devices via the at least one controller device, wherein the workload/storage allocation device is configured to:
        identify a first workload that requires storage resources;
        retrieve at least one first workload performance requirement associated with the first workload;
        retrieve, via the at least one controller device and from the respective storage device attribute structure included in each of the plurality of storage devices, the storage device attributes that identify the storage device primitive information and the current firmware-based minimum performance capabilities of each of the plurality of storage devices;
        determine, based on the storage device attributes, that at least one of the plurality of storage devices includes storage device primitive information and current firmware-based minimum performance capabilities that guarantee that the at least one first workload performance requirement associated with the first workload will be satisfied; and
        allocate, for use with the first workload, the at least one of the plurality of storage devices that includes the storage device primitive information and the current firmware-based minimum performance capabilities that guarantee that the at least one first workload performance requirement associated with the first workload is satisfied during the performance of the first workload.

2. The system of claim 1, wherein the workload/storage allocation device is configured to:
    identify a second workload that requires storage resources;
    retrieve at least one second workload performance requirement associated with the second workload;
    retrieve, via the at least one controller device and from the respective storage device attribute structure included in each of the plurality of storage devices, the storage device attributes that identify the storage device primitive information and the current firmware-based minimum performance capabilities of each of the plurality of storage devices;
    determine, based on the storage device attributes, that at least one of the plurality of storage devices includes storage device primitive information and the current firmware-based minimum performance capabilities that guarantee that the at least one second workload performance requirement associated with the second workload will be satisfied; and
    allocate, for use with the second workload while the first workload uses the at least one of the plurality of storage devices that includes the storage device primitive information and the current firmware-based minimum performance capabilities that guarantee that the at least one first workload performance requirement associated with the first workload will be satisfied, the at least one of the plurality of storage devices that includes the storage device primitive information and the current firmware-based minimum performance capabilities that guarantee that the at least one second workload performance requirement associated with the second workload is satisfied during the performance of the second workload.

3. The system of claim 1, wherein the respective storage device attribute structure included in each of the plurality of storage devices stores storage device attributes that identify the current firmware-based minimum performance capabilities of that storage device including:
    first current firmware-based minimum performance capabilities of that storage device when that storage devices utilizes a first block size; and
    second current firmware-based minimum performance capabilities of that storage device when that storage device utilizes a second block size that is different than the first block size.

4. The system of claim 3, wherein the retrieving the storage device attributes that identify the current firmware-based minimum performance capabilities of each of the plurality of storage devices includes:
    determining a block size utilized by each storage device and, in response, retrieving the current firmware-based minimum performance capability of that storage device when that storage devices utilizes that block size from the storage device attribute structure in that storage device.

5. The system of claim 4, wherein the at least one controller device includes a remote access controller device having a sideband connection to at least one of the plurality of storage devices.

6. The system of claim 1, wherein the workload/storage allocation device is configured to:
monitor the use by the first workload of the at least one of the plurality of storage devices that includes the current firmware-based minimum performance capabilities that guarantee that the at least one first workload performance requirement associated with the first workload will be satisfied;
determine the performance of the at least one of the plurality of storage devices that includes the current firmware-based minimum performance capabilities that guarantee that the at least one first workload performance requirement associated with the first workload will be satisfied; and
report the performance of the at least one of the plurality of storage devices that includes the current firmware-based minimum performance capabilities that guarantee that the at least one first workload performance requirement associated with the first workload will be satisfied.

7. An Information Handling System (IHS), comprising:
a processing system; and
a memory system that is coupled to the processing system and that includes instructions that, when executed by the processing system, cause the processing system to provide a workload/storage allocation engine that is configured to:
identify a first workload that requires storage resources;
retrieve at least one first workload performance requirement associated with the first workload;
retrieve, via at least one controller device and from a respective storage device attribute structure included in each of a plurality of storage devices, storage device attributes that are stored in the respective storage device attribute structures and that identify storage device primitive information that includes primitive details of hardware in each of the plurality of storage devices that effect performance capabilities of that storage device based on a firmware version on that storage device, and current firmware-based minimum performance capabilities of each of the plurality of storage devices that were determined for that storage device based on a current version of firmware on that storage device and provided in that storage device in a firmware update with the current version of the firmware;
determine, based on the storage device attributes, that at least one of the plurality of storage devices includes storage device primitive information and current firmware-based minimum performance capabilities that guarantee that the at least one first workload performance requirement associated with the first workload will be satisfied; and
allocate, for use with the first workload, the at least one of the plurality of storage devices that includes the storage device primitive information and current firmware-based minimum performance capabilities that guarantee that the at least one first workload performance requirement associated with the first workload will be satisfied.

8. The IHS of claim 7, wherein the workload/storage allocation engine is configured to:
identify a second workload that requires storage resources;
retrieve at least one second workload performance requirement associated with the second workload;
retrieve, via the at least one controller device and from the respective storage device attribute structure included in each of the plurality of storage devices, the storage device attributes that are stored in the respective storage device attribute structures and that identify the storage device primitive information and the current firmware-based minimum performance capabilities of each of the plurality of storage devices;
determine, based on the storage device attributes, that at least one of the plurality of storage devices includes storage device primitive information and the current firmware-based minimum performance capabilities that guarantee that the at least one second workload performance requirement associated with the second workload will be satisfied; and
allocate, for use with the second workload while the first workload uses the at least one of the plurality of storage devices that includes the storage device primitive information and the current firmware-based minimum performance capabilities that guarantee that the at least one first workload performance requirement associated with the first workload will be satisfied, the at least one of the plurality of storage devices that includes the storage device primitive information and the current firmware-based minimum performance capabilities that guarantee that the at least one second workload performance requirement associated with the second workload is satisfied during the performance of the second workload.

9. The IHS of claim 7, wherein the respective storage device attribute structure included in each of the plurality of storage devices stores storage device attributes that identify the current firmware-based minimum performance capabilities of that storage device including:
first current firmware-based minimum performance capabilities of that storage device when that storage devices utilizes a first block size; and
second current firmware-based minimum performance capability of that storage device when that storage device utilizes a second block size that is different than the first block size.

10. The IHS of claim 9, wherein the retrieving the storage device attributes that identify the current firmware-based minimum performance capabilities of each of the plurality of storage devices includes:
determining a block size utilized by each storage device and, in response, retrieving the current firmware-based minimum performance capability of that storage device when that storage devices utilizes that block size from the storage device attribute structure in that storage device.

11. The IHS of claim 10, wherein the at least one controller device includes a remote access controller device having a sideband connection to at least one of the plurality of storage devices.

12. The IHS of claim 7, wherein the workload/storage allocation engine is configured to:
monitor the use by the first workload of the at least one of the plurality of storage devices that includes the current firmware-based minimum performance capabilities that guarantee that the at least one first workload performance requirement associated with the first workload will be satisfied; and determine the performance of the at least one of the plurality of storage devices that includes the current firmware-based minimum performance capabilities that guarantee that the at least one first workload performance requirement associated with the first workload will be satisfied.

13. The IHS of claim 12, wherein the workload/storage allocation engine is configured to:

report the performance of the at least one of the plurality of storage devices that includes the current firmware-based minimum performance capabilities that guarantee that the at least one first workload performance requirement associated with the first workload will be satisfied.

14. A method for performance-based allocation of storage for workloads, comprising:

identifying, by a workload/storage allocation device, a first workload that requires storage resources;

retrieving, by the workload/storage allocation device, at least one first workload performance requirement associated with the first workload;

retrieving, by the workload/storage allocation device via at least one controller device and from a respective storage device attribute structure included in each of a plurality of storage devices, storage device attributes that are stored in the respective storage device attribute structures and that identify storage device primitive information that includes primitive details of hardware in each of the plurality of storage devices that effect performance capabilities of that storage device based on a firmware version on that storage device, and current firmware-based minimum performance capabilities of each of the plurality of storage devices that were determined for each of the plurality of storage devices based on a current version of firmware on that storage device and provided in that storage device in a firmware update with the current version of the firmware;

determining, by the workload/storage allocation device based on the storage device attributes, that at least one of the plurality of storage devices includes storage device primitive information and current firmware-based minimum performance capabilities that guarantee that the at least one first workload performance requirement associated with the first workload will be satisfied; and allocating, by the workload/storage allocation device for use with the first workload, the at least one of the plurality of storage devices that includes the storage device primitive information and current firmware-based minimum performance capabilities that guarantee that the at least one first workload performance requirement associated with the first workload will be satisfied.

15. The method of claim 14, further comprising:

identifying, by the workload/storage allocation device, a second workload that requires storage resources;

retrieving, by the workload/storage allocation device, at least one second workload performance requirement associated with the second workload;

retrieving, by the workload/storage allocation device via the at least one controller device and from the respective storage device attribute structure included in each of the plurality of storage devices, the storage device attributes that are stored in the respective storage device attribute structures and that identify the storage device primitive information and the current firmware-based minimum performance capabilities of each of the plurality of storage devices;

determining, by the workload/storage allocation device based on the storage device attributes, that at least one of the plurality of storage devices includes storage device primitive information and the current firmware-based minimum performance capabilities that guarantee that the at least one second workload performance requirement associated with the second workload will be satisfied; and allocating, by the workload/storage allocation device for use with the second workload while the first workload uses the at least one of the plurality of storage devices that includes the storage device primitive information and the current firmware-based minimum performance capabilities that guarantee that the at least one first workload performance requirement associated with the first workload will be satisfied, the at least one of the plurality of storage devices that includes the storage device primitive information and the current firmware-based minimum performance capabilities that guarantee that the at least one second workload performance requirement associated with the second workload is satisfied during the performance of the second workload.

16. The method of claim 14, wherein the respective storage device attribute structure included in each of the plurality of storage devices stores storage device attributes that identify the current firmware-based minimum performance capabilities of that storage device including:

first current firmware-based minimum performance capabilities of that storage device when that storage devices utilizes a first block size; and second current firmware-based minimum performance capabilities of that storage device when that storage device utilizes a second block size that is different than the first block size.

17. The method of claim 16, wherein the retrieving the storage device attributes that identify the current firmware-based minimum performance capabilities of each of the plurality of storage devices includes:

determining a block size utilized by each storage device and, in response, retrieving the current firmware-based minimum performance capability of that storage device when that storage devices utilizes that block size from the storage device attribute structure in that storage device.

18. The method of claim 15, wherein the at least one controller device includes a remote access controller device having a sideband connection to at least one of the plurality of storage devices.

19. The method of claim 14, further comprising:

monitoring, by the workload/storage allocation device, the use by the first workload of the at least one of the plurality of storage devices that includes the current firmware-based minimum performance capabilities that satisfy the at least one first workload performance requirement; and determining, by the workload/storage allocation device, the performance of the at least one of the plurality of storage devices that includes the previously measured minimum performance capabilities that guarantee that the at least one first workload performance requirement associated with the first workload will be satisfied.

20. The method of claim 14, further comprising:

reporting, by the workload/storage allocation device, the performance of the at least one of the plurality of storage devices that includes the current firmware-based minimum performance capabilities that guarantee that the at least one first workload performance requirement associated with the first workload will be satisfied.

\* \* \* \* \*